United States Patent Office 3,468,953
Patented Sept. 23, 1969

3,468,953
PROCESS FOR MANUFACTURE OF METHYLAMINES
Paul Besson and Pierre Thirion, La Chambre, Savoie, France, assignors to Ugine Kuhlmann, Paris, France, a corporation of France
No Drawing. Continuation-in-part of application Ser. No. 325,152, Nov. 20, 1963. This application July 6, 1966, Ser. No. 563,036
Claims priority, application France, July 8, 1965, 23,947
Int. Cl. C07c 85/12; B01j 11/16
U.S. Cl. 260—583    7 Claims

ABSTRACT OF THE DISCLOSURE

A process for the manufacture of methylamines comprising hydrogenating hydrocyanic acid under pressure in gaseous phase at a temperature between 150° C. and 300° C. in the presence of a catalyst of the group of platinum metals. The catalyst is disposed on a support of a mixture of diatomaceous earth and kaolin, a Lewis acid or a mixture of diatomaceous earth and kaolin with an acidic promoter. The acidic promoter is either a protonic acid or a Lewis acid.

---

This application is a continuation-in-part of our application Ser. No. 325,152, filed Nov. 20, 1963, now abandoned.

This invention relates to a process for manufacture of methylamines through hydrogenation of hydrocyanic acid, and to catalysts for use in such process.

Heretofore, one known method for obtention of methylamines comprised hydrogenating hydrocyanic acid according to the following reaction:

$$HCN + 2H_2 \rightarrow CH_3-NH_2$$
$$2HCN + 4H_2 \rightarrow (CH_3)_2NH + NH_3$$
$$3HCN + 6H_2 \rightarrow (CH_3)_3N + 2NH_3$$

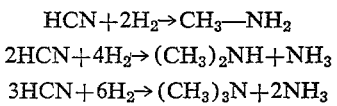

This method formed the object of some laboratory research many years ago, but poor results encountered discouraged its industrial development for the following reasons:

(1) Though the above reactions seem very simple, in fact the hydrogenation of hydrocyanic acid is a difficult operation because some side reactions may become the preponderant reaction under certain conditions. For example, the polymerization of hydrocyanic acid with formation of unwanted known solid products was feared in particular and also the hydrogenolysis of hydrocyanic acid with methane and ammonia according to the reaction:

$$HCN + 3H_2 \rightarrow CH_4 + NH_3$$

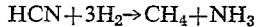

(2) In many circumstances, the hydrocyanic acid seems to be a manifest poison of some metals in current use as a hydrogenation catalyst. This is particularly true in the case of catalysts based on metals such as copper, nickel and cobalt.

(3) The high toxicity of hydrocyanic acid discouraged the investigators.

This present invention enables one to compensate for the previously-mentioned drawbacks. It has as its object a process for making methylamines consisting in hydrogenating the hydrocyanic acid under pressure in gaseous phase at a temperature below 250° C. in the presence of a catalyst consituted of a metal of Group VIII of the International Elements Classification and incorporated into an adequate support.

The catalyst is more particularly constituted of a metal pertaining to the group of the platinum metals. It is disposed on a support which will be described hereinafter and which is usually constituted of a mixture in definite proportions of diatomaceous earth and kaolin. The proportions of diatomaceous earth and kaolin comprise a ratio by weight of diatomaceous earth/kaolin of about 0.1 to 10, and preferably 2.5 to 3.

The active metal content of the catalyst is between about 0.50 and 10%, and preferably about 5%.

The hydrogenation of hydrocyanic acid is carried out under a pressure superior to the air pressure and comprised between 1 and 15 atmospheres, and preferably about 8 atmospheres.

The molar ratio hydrogen/hydrocyanic acid is between about 5 and 30, and preferably about 15 to 20.

The temperature is inferior to 250° C., but greater than 150° C., and preferably between 150 and 200° C.

The hydrocyanic acid must not contain such impurities as sulphur, phosphorus, arsenic, etc.

Owing to the process of the invention, it has been possible to carry out with a high yield the hydrogenation of hydrocyanic acid in gaseous phase in excellent economical conditions, and with comparatively simple equipment.

Additionally, this process has the very important advantage of using HCN and $H_2$ in proportions which allow the industrial use of the HCN and $H_2$ mixture resulting from the processes of endothermic synthesis of HCN from methane and ammonia. The methylamines synthesis may thus be directly associated to this synthesis and be carried out from methane and ammonia.

In the particular case of the catalyst palladium, its preparation may be carried out in the following, non-limiting way:

At a temperature approaching 70° C. a desired quantity of palladium chloride $PdCl_2$ is introduced into an aqueous diluted solution of hydrochloric acid. To the obtained homogeneous solution is added an aqueous 28% ammonia solution in an amount until the precipitate which first formed is dissolved. An aqueous and homogeneous solution of dichloramine palladium $Pd(NH_3)_2Cl_2$ is thus obtained.

A definite quantity of diatomaceous earth is then introduced into this solution to obtain a thick and smooth paste which is dried at 150° C. Next, the paste is heated to 350° C. for 1 to 3 hours and thereafter is finely crushed and sifted.

To the obtained powder a suitable quantity of kaolin is then added, and this mixture is gradually dampened with water so that a dry paste is obtained by kneading, and then is transformed into little rods through an adequate extrusion press. The thus shaped catalyst is dried at 150° C., and its temperature is raised to about 300° C. to 450° C., and preferably about 350° C. for 1 to 3 hours.

After this treatment, very solid rods are obtained and these are placed into an adequate enclosure where they are subjected to a thermic treatment at a temperature between 300° C. and 500° C. in chlorine atmosphere for about 1 hour. This last treatment improves very appreciably the catalytic activity of the catalyst.

The thus prepared catalyst is ready for use, and it is then placed into the reactor in which before the hydrogenation reaction of hydrocyanic acid, it is reduced with hydrogen at a temperature between 50° C. and 300° C., and preferably approaching 120° C.–150° C.

After being in use for a time, the catalyst requires regeneration due to a more or less important clogging. For example, this regeneration can be carried out as follows:

In a first step, the catalyst is subjected to a stream of air and water vapor in strictly verified proportions, i.e., 50 to 100 dm.³ of air and 0.25 to 30 kg. of vapor per hour and per dm.³ of catalyst. This treatment is carried out at a temperature of about 300° C. to 500° C., and preferably about 400° C. to 450° C. until the effluent of the furnace is substantially free from carbonic gas.

In a second step, the temperature is maintained at substantially the same value and the air and water vapor are superseded by chlorine. This second step is carried on for about 1 hour.

After reduction with hydrogen at a temperature approaching 120° C. to 150° C., the catalyst is ready anew for use in the manufacture of methylamines.

One example of a detailed preparation of the catalyst according to the invention is as follows:

This example, which is not given by way of limitation, relates to the preparation of palladium.

At a temperature of about 70° C. one dissolved 40.6 g. of palladium chloride $PdCl_2$ in 250 cm.$^3$ of an aqueous solution of hydrochloric acid containing 90 cm.$^3$ of an aqueous and concentrated solution of hydrochloric acid having a density of 1.19.

After dissolving and cooling, 140 cm.$^3$ of a 28% ammonia solution was added slowly under stirring, and the more or less heterogeneous solution obtained was boiled until there was a total dissolution of the formed precipitate.

Thereafter, 480 g. of diatomaceous earth were introduced gradually into the aqueous and homogeneous solution of palladium dichloramine, and after kneading, the obtained paste was dried at 150° C. and then subjected to a thermic treatment at 350° C. for 2 hours.

After crushing and sifting the solid mass resulting from the previous operations through a 200 mesh screen, we added 170 g. of kaolin and then performed a dry kneading. Following this, we carried out a kneading with water to obtain a plastic paste just slightly damp.

This paste was shaped by an extruding machine fitted with a die, the holes of which were 5 mm. in diameter and the so manufactured rods were dried at 150° C. and then subjected to a thermic treatment for 2 hours at a temperature approaching 350° C.

Finally, the obtained catalyst was subjected to a thermic treatment in the presence of chlorine at a temperature approaching 400–450° C. for about 1 hour.

This catalyst was ready for use and had the following composition:

| | Percent |
|---|---|
| Palladium (in the form of chloride $PdCl_2$) | 4.2 |
| Support | 95.8 |

This catalyst was used for making methylamines according to the process of the invention in the following, non-limiting examples.

EXAMPLE 1

Into an oven constituted of a stainless steel tube of 1.4 m. length and 30 mm. diameter, 1 dm.$^3$ of the palladium catalyst prepared as above was placed.

The temperature of the oven was raised to 150° C., and the catalyst was reduced by hydrogen for about 1 hour. When the reduction was over, the temperature of the oven was raised to 185° C.

Then, hydrogen was delivered into contact with the catalytic mass at the rate of 160 moles per hour, or 3600 dm.$^3$ at 0° C. under 760 mm. mercury of pressure, and the hydrocyanic acid at the rate of 8.78 moles per hour, or 237 g. The molar ratio hydrogen/hydrocyanic acid was equal to 18.2.

The pressure in the catalyst oven was maintained at 8 atmospheres.

The following results were obtained:

| | Percent |
|---|---|
| Total conversion rate of hydrocyanic acid | 100 |
| Yield in monomethylamine | 14.2 |
| Yield in dimethylamine | 17.5 |
| Yield in trimethylamine | 57.5 |
| Total yield in methylamines | 89.2 |
| Yield in methane | 9.5 |

The productions per hour were the following for methane, ammonia and methylamines respectively:

| | G. |
|---|---|
| Methane | 13.3 |
| Ammonia | 86.3 |
| Monomethylamine | 38.7 |
| Dimethylamine | 34.6 |
| Trimethylamine | 99.2 |

EXAMPLE 2

After working some hours, and without any reactivation treatment of the catalyst, the following reaction conditions were adopted:

| | |
|---|---|
| Temperature | 185° C. |
| Absolute pressure | 8 atmospheres. |
| Hydrogen flow | 240 moles per hour, or about 5400 dm.$^3$ at 0° C. under 760 mm. mercury of pressure. |
| Hydrocyanic acid flow | 18.4 moles per hour, or 497 g. |

The molar ratio hydrogen/hydrocyanic acid was equal to 13.

The following results were obtained:

| | Percent |
|---|---|
| Total conversion rate of hydrocyanic acid | 100 |
| Yield in monomethylamine | 20.2 |
| Yield in dimethylamine | 18.4 |
| Yield in trimethylamine | 40.5 |
| Total yield in methylamines | 79.1 |
| Yield in methane | 18.3 |

The productions per hour were the following for methane, ammonia and methylamines respectively:

| | G. |
|---|---|
| Methane | 54 |
| Ammonia | 179 |
| Monomethylamine | 115.5 |
| Dimethylamine | 76.3 |
| Trimethylamine | 146.4 |

EXAMPLE 3

Here also without any reactivation treatment of the catalyst, a new hydrogenation reaction of hydrocyanic acid was carried out under the following conditions:

| | |
|---|---|
| Temperature | 185° C. |
| Absolute pressure | 3 atmospheres. |
| Hydrogen flow | 160 moles per hour, or about 3600 dm.$^3$ at 0° C. under 760 mm. mercury of pressure. |
| Hydrogen acid flow | 8.95 moles per hour or 242 g. |

The molar ratio hydrogen/hydrocyanic acid was equal to 17.9.

The following results were obtained:

| | Percent |
|---|---|
| Total conversion rate of hydrocyanic acid | 100 |
| Yield in monomethylamine | 54.8 |
| Yield in dimethylamine | 16.1 |
| Yield in trimethylamine | 16.7 |
| Total yield in methylamines | 87.6 |
| Yield in methane | 9.6 |

The productions per hour were the following for methane, ammonia and methylamines respectively:

| | G. |
|---|---|
| Methane | 15.35 |
| Ammonia | 48.10 |
| Monomethylamine | 151.70 |
| Dimethylamine | 32.50 |
| Trimethylamine | 29.40 |

After regenerating the catalyst according to the previously-described method, we realized again the hydrogenation of hydrocyanic acid in highly satisfactory conditions and the catalyst activity remained practically constant.

We have found that the introduction of a protonic acid, such as phosphoric acid, or of a Lewis acid, such as aluminum chloride, aluminum fluoride, aluminum phosphate, zinc chloride, silica-alumina, or even activated alumina, into the catalyst considerably increases the catalyst activity and effective life. This introduction also noticeably simplifies regeneration and reactivation of the catalyst by avoiding, in most cases, the thermal treatment in a chlorine atmosphere.

This modification of the invention comprises introducing into the catalyst-support either a protonic acid (a stable acid such as phosphoric acid), or a Lewis acid, such as aluminum phosphate, fluoride or chloride, zinc chloride and alumina.

These various compounds, hereafter called "acidic promoters," may be independent of the catalyst-support, in which case they are incorporated into the catalyst by impregnaiton with a solution different from or the same as that of the noble metal catalyst. These acidic promoters may also be a part of the catalyst support composition. Thus activated alumina, aluminum phosphate or the various silica-alumina catalysts used in hydrocarbon cracking are both supports and acidic promoters, and therefore require no transformation.

When aluminum chloride is the acidic promoter, it must be kept in mind that this salt distils above 200° C. Besides, the catalysts are usually regenerated after some time in service by calcination in air above 400° C. to effect combustion of the organic compounds covering them. After such a treatment, it is necessary either to introduce a new amount of aluminum chloride into the catalyst by treating the catalyst-support at a sufficient temperature in the presence of chlorine, or to impregnate again the catalyst and its support with an aluminum chloride solution. To avoid these operations, we prefer the use of stable and non-volatile acidic promoters.

The catalyst preparation may be carried out according to the method described herein, namely, impregnation of diatomaceous earth with a mixed solution of a chloride of the metal of Group VIII of the Periodic Table and of a soluble acidic promoter of the usual or the Lewis type to form a paste. This paste is then dried and calcined at 350° C., and then finely crushed and sifted to produce a powder. A suitable amount of kaolin is added to the obtained powder, and the mixture is dampened. After kneading, the dry paste is shaped by die-extrusion, and the obtained rods are dried and calcined at 350° C. After hydrogen reduction the catalyst is ready for use. The thermal treatment in chlorine atmosphere is not needed, even after the air-regeneration of the catalyst.

Another way of preparing the catalyst comprises impregnating an inorganic porous solid by immersion in a solution containing the products to be incorporated. The solid is previously cleared of gases and vapors adsorbed by drying, and the impregnation is enhanced by evacuating in the container wherein the solid is immersed.

If the solid is a Lewis acid, for example, activated alumina or silica-alumina catalyst utilized for hydrocarbon cracking, the impregnation solution is a simple salt solution of the metal of Group VIII of the Periodic Table. If the solid has no acidic properties, it is necessary for the solution to contain an acid, giving the word its broadest meaning.

Another catalyst based on diatomaceous earth is obtained by preliminary preparation of the support by die-extrusion of a dry paste containing a mixture of diatomaceous earth and kaolin, drying and calcining of the resulting rods. The support is impregnated by immersion in a solution containing, besides the metal catalyst, a protonic or a Lewis acid.

Alumina is impregnated by a simple solution of the metal catalyst, or by a mixed solution if the acidic properties of the support are to be increased. In the latter case, for instance, the utilized acid may be phosphoric acid which, with alumina, gives aluminum phosphate.

After being used for some time, the catalyst requires regeneration due to an important amount of clogging. This regeneration is carried out as follows: nitrogen is directed onto the catalyst to eliminate hydrogen from the catalysis furnace. Then the nitrogen is replaced by air at the rate of 30 to 60 dm.$^3$ per dm.$^3$ of catalyst. The furnace temperature is then brought to 400–420° C. until the furnace effluent contains no more carbon dioxide.

After a reduction with hydrogen carried out at a temperature of about 120–150° C., the catalyst is ready again for production of methylamines.

Catalysts prepared by impregnation of activated alumina

The catalysts prepared by impregnation of activated alumina, which hydrogenate hydrocyanic acid at a temperature normally between 200 and 240° C., present particularities because they are highly active and effect hydrogenolysis of hydrocyanic acid into methane and ammonia. This super-activity may last over a period of 60 hours if it is not corrected at the outset. For that purpose, it suffices to inhibit the catalytic action by placing it under less favorable hydrogenation conditions, for instance by using a molar ratio hydrogen/hydrocyanic acid below 5, or which is easier, by starting at 170–175° C. for 1 to 2 hours or, more precisely, while untransformed hydrocyanic acid appears in the furnace effluent. Then the normal conditions herein identified are employed. The methane and ammonia yield is then lower than 20% and may come down to 10%. This previous hydrogenation phase must be renewed after each regeneration.

The conditions for the catalytic production of methylamines are those set forth herein. The molar ratio hydrogen/hydrocyanic acid is between 5 and 30, and usually of the order of 10 to 20. The operating temperature is below 300° C. and usually between 150 and 250° C.

The supply rate of the catalyst with hydrocyanic acid is between 4 and 40 moles per hour and per dm.$^3$ of the catalyst, and more usually between 5 and 20 moles per hour and per dm.$^3$ of the catalyst.

The catalyst reactivation results from combustion of the carbonaceous matter by air-treatment at a temperature of about 400–450° C.

The reactor may be supplied with hydrocyanic acid alone or with a hydrocyanic acid/hydrogen mixture, such as the one resulting from the synthesis of the acid by endothermic reaction between methane and ammonia.

The advantages of this modification include production of methylamine by hydrogenation of hydrocyanic acid under particularly simple and economic conditions.

The following non-limitative examples illustrate the modification of the process.

EXAMPLE 4

Preparation of the catalyst

A porous support was previously prepared by dry-mixing 65 parts of diatomaceous earth and 35 parts of kaolin. After transformation into a paste with water, the mixture was shaped by extrusion through a 6 mm. die. The resulting rods were dried and then calcined for 2 hours.

The following aqueous solution was prepared: to 180 cm.$^3$ of distilled water heated to 70–80° C. were added 40 cm.$^3$ of an aqueous hydrochloric acid solution, 19% by weight and then 31.5 g. of palladium chloride. After complete dissolution, 37.5 g. of aluminum chloride were added to the solution. Then the solution was cooled down and its volume increased to 270 cm.$^3$ with distilled water.

570 g. of the above-described support were introduced into an appropriate mixer and, after starting the mixer, all the preceding solution was progressively poured into same.

After air-drying at 40–50° C. for 8 to 10 hours, then at 140–150° C. for 2 hours, the catalyst was ready for use. After reduction, the catalyst contained:

| | Percent |
|---|---|
| Palladium | 3 |
| Aluminum chloride | 6 |
| Support | 91 |

Production of methylamines

The catalyst thus prepared was placed in a furnace comprising a stainless steel catalytic column 30 mm. in diameter and 1 dm.³ in capacity. After reduction by hydrogen at 120–130° C. for 1 hour, the furnace temperature was brought to 175° C. Then the catalytic mass was contacted with hydrogen at the rate of 150 moles/hour, that is 3400 dm.³ at 0° C. and under 760 mm. mercury, and with hydrocyanic acid at the rate of 8 moles/hour, that is 216 g. The molar ratio hydrogen/hydrocyanic acid was 18.8, and the pressure in the catalytic furnace was maintained at 8 atmospheres.

After 21 hours' working, and though there appeared no noticeable decrease in the catalyst activity, the operation was stopped and the following results were obtained:

| | Percent |
|---|---|
| Total conversion rate of hydrocyanic acid | 99.9 |
| Yield in monoethylamine | 56.3 |
| Yield in dimethylamine | 21.6 |
| Yield in trimethylamine | 14.2 |
| Total yield in methylamines | 92.1 |
| Yield in methane | 7.9 |

The respective productions per hour in methane, ammonia and methylamines were:

| | G. |
|---|---|
| Methane | 10.1 |
| Ammonia | 38.1 |
| Monoethylamine | 140 |
| Dimethylamine | 38.8 |
| Trimethylamine | 22.2 |

As hereabove indicated, the air-regeneration of this catalyst at 400° C. annihilates its catalytic activity. The activity becomes normal again only after a new impregnation of the catalyst with an aluminum chloride solution. If aluminum chloride is replaced by phosphoric acid (weight per weight) in the impregnation solution, the obtained results are substantially the same, and they are constant, even after air-regeneration. The same results are also obtained when aluminum chloride is replaced by aluminum fluoride, a non-volatile salt, by introducing hydrofluoric acid instead of aluminum chloride into the impregnation solution. The attack of kaolin by the acid gives the fluoride in situ.

EXAMPLE 5

Preparation of the catalyst

An aqueous solution was prepared as follows: to 190 cm.³ of distilled water heated to 70–80° C. were added 62 cm.³ of an aqueous hydrochloric acid solution, 19% by weight, and then 41 g. of palladium chloride. After complete dissolution, 57 g. of phosphoric acid, 85% by weight, were added to the solution. The solution was then cooled down and its volume was increased to 290 cm.³ with distilled water.

Into an appropriate reactor, 1 dm.³ of activated alumina balls, were poured. The balls were previously dried for 2 hours at 180° C.

After starting up of the reactor, the above-prepared solution was progressively poured onto the alumina balls which absorbed it totally and homogeneously.

After air-drying at 40–50° C. for about 10 hours, then at 140–150° C. for 2 hours, and finally at 400° C. for 2 hours, this catalyst was ready for use. It contained about 3% palladium and 6% phosphoric acid as aluminum phosphate.

Production of methylamines

The catalyst was introduced into the furnace described in Example 1, and its hydrogen reduction was carried out under the same conditions.

The furnace temperature was brought to 175° C. for the start of the operation, which was also carried out as previously described, i.e. pressure, 8 atm.; hydrogen output, 150 moles/hour; hydrocyanic acid output, 8 moles/hour; and molar ratio hydrogen/hydrocyanic acid, 18.8.

The untransformed hydrocyanic acid appeared in the furnace effluent after 2 hours operation. Then, the temperature was progressively increased to reach 200° C. after 3½ hours operation, and it was then maintained at 200° C. during the whole operation.

After 26 hours' working, and though there appeared no noticeable decrease in the catalyst activity, the operation was stopped, and the following results were obtained:

| | Percent |
|---|---|
| Total conversion rate of hydrocyanic acid | 100 |
| Yield in monoethylamine | 23.5 |
| Yield in dimethylamine | 19.4 |
| Yield in trimethylamine | 39.2 |
| Total yield in methylamines | 82.1 |
| Yield in methane | 17.9 |

The yield in methane was 37% during the first hour and 22% during the third hour, and then went on decreasing.

The respective hour productions in methane, ammonia and methylamines were as follows:

| | G. |
|---|---|
| Methane | 22.8 |
| Ammonia | 73.1 |
| Monoethylamine | 58.3 |
| Dimethylamine | 34.9 |
| Trimethylamine | 61.8 |

The catalyst was submitted to five air-regenerations at 400–420° C. without showing any noticeable decrease in its activity. The obtained results, conversion rate and methane yield, were similar to those indicated hereabove.

For each new production processing it was necessary to provide a first hydrogenation phase at 175° C., lasting 2 to 3 hours, followed by a second hydrogenation phase which ran over a period of 70 to 80 hours.

We claim:
1. A process for manufacture of methylamines comprising reacting hydrocyanic acid and hydrogen in the gaseous phase in the presence of a catalyst, said reacting being carried out at a temperature between 150° C. and 300° C., at a pressure between substantially about 1 and 15 atmospheres, said hydrocyanic acid and said hydrogen having a molar ratio of hydrogen/hydrocyanic acid of substantially about 5:1 to 30:1, said catalyst comprising 0.50 to 10% by weight of a metal of the group of platinum metals, disposed upon a support selected from the group consisting of: a mixture of diatomaceous earth and kaolin; a Lewis acid; and a mixture of diatomaceous earth, kaolin and an acidic promoter comprising one of a protonic acid and a Lewis acid.

2. The process of claim 1 wherein said acidic promoter is selected from the group consisting of phosphoric acid, aluminum chloride, aluminum fluoride, aluminum phosphate, zinc chloride, silica alumina and activated alumina.

3. The process of claim 1 characterized by said diatomaceous earth and kaolin being present in a ratio by weight of diatomaceous earth/kaolin of about 0.1:1 to 10:1.

4. The process of claim 1 characterized by carrying out said reacting at a temperature between 150° C. and 200° C., at a pressure of about 8 atmospheres, said metal of said catalyst being about 5% by weight of said catalyst and said molar ratio of hydrogen/hydrocyanic acid being about 15:1 to 20:1.

5. A process for manufacture of methylamines comprising reacting hydrocyanic acid and hydrogen having a molar ratio of hydrogen to hydrocyanic acid of substantially about 5:1 to 30:1 in the gaseous phase at a temperature between 150° C. and 300° C., at a pressure between substantially about 1 and 15 atmospheres in the presence of a catalyst comprising 0.50 to 10% by weight of a metal of the group of platinum metals and disposed upon a support comprising a mixture of diatomaceous earth and kaolin with an acidic promoter comprising one of a protonic acid and of a Lewis acid.

6. The process of claim 5 characterized by said diatomaceous earth and kaolin being present in a ratio by weight of about 0.1:1 to 10:1.

7. The process of claim 5 wherein said acidic promoter is selected from the group consisting of phosphoric acid, aluminum chloride, aluminum fluoride, aluminum phosphate, zinc chloride, silica alumina and activated alumina.

References Cited

UNITED STATES PATENTS

| 1,327,396 | 1/1920 | Kimura | 252—459 |
| 1,736,872 | 11/1929 | Barsky. | |
| 2,072,247 | 3/1937 | Dreyfus. | |
| 2,785,138 | 3/1957 | Milliken | 252—415 |
| 2,977,323 | 3/1961 | Johnson et al. | 252—415 |

FOREIGN PATENTS 435,404  9/1935  Great Britain.

CHARLES B. PARKER, Primary Examiner

R. L. RAYMOND, Assistant Examiner

U.S. Cl. X.R.

252—459